(12) United States Patent
Haleem et al.

(10) Patent No.: US 11,412,383 B2
(45) Date of Patent: Aug. 9, 2022

(54) SYSTEMS AND METHODS FOR PROVIDING AND USING A DECENTRALIZED WIRELESS NETWORK

(71) Applicant: HELIUM SYSTEMS, INC., San Francisco, CA (US)

(72) Inventors: Amir Haleem, San Francisco, CA (US); Andrew Thompson, San Francisco, CA (US); Andrew Allen, San Francisco, CA (US); Marc Nijdam, San Francisco, CA (US); Jay Kickliter, San Francisco, CA (US)

(*) Notice: Subject to any disclaimer, the term of this patent is extended or adjusted under 35 U.S.C. 154(b) by 0 days.

(21) Appl. No.: 16/239,019

(22) Filed: Jan. 3, 2019

(65) Prior Publication Data

US 2019/0208422 A1 Jul. 4, 2019

Related U.S. Application Data

(60) Provisional application No. 62/613,364, filed on Jan. 3, 2018.

(51) Int. Cl.
| | |
|---|---|
| *H04W 12/102* | (2021.01) |
| *H04W 64/00* | (2009.01) |
| *G06F 16/182* | (2019.01) |
| *H04L 9/08* | (2006.01) |
| *H04W 88/16* | (2009.01) |
| *H04L 9/06* | (2006.01) |
| *H04L 9/32* | (2006.01) |
| *H04L 9/12* | (2006.01) |

(52) U.S. Cl.
CPC ...... *H04W 12/102* (2021.01); *G06F 16/1824* (2019.01); *H04L 9/0643* (2013.01); *H04L 9/0861* (2013.01); *H04L 9/12* (2013.01); *H04L 9/3239* (2013.01); *H04L 9/3247* (2013.01); *H04L 9/3297* (2013.01); *H04W 64/003* (2013.01); *H04W 88/16* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 10,135,834 B1 * | 11/2018 | Galebach | .............. H04L 63/102 |
| 10,594,034 B1 | 3/2020 | Tran et al. | |
| 10,742,837 B1 | 8/2020 | Sankarapandian et al. | |
| | | (Continued) | |

OTHER PUBLICATIONS

Co-pending U.S. Appl. No. 16/586,261, filed Sep. 27, 2019.

(Continued)

*Primary Examiner* — Noel R Beharry
*Assistant Examiner* — Rodrick Mak
(74) *Attorney, Agent, or Firm* — Wilson Sonsini Goodrich & Rosati

(57) ABSTRACT

Disclosed herein are systems and methods for facilitating data transmission using a decentralized consensus network. The system comprising: a verified and decentralized consensus network comprising a plurality of node, wherein at least one of the nodes is configured to: (a) determine a target node from the plurality of nodes to be verified; verify the target node by validating a geographic location of the target node or a time of the target node; and (c) receive a token for verifying and validating the target node.

12 Claims, 10 Drawing Sheets

(56) References Cited

U.S. PATENT DOCUMENTS

| | | | | |
|---|---|---|---|---|
| 2010/0002583 | A1* | 1/2010 | Maxemchuk | H04L 12/66 370/235 |
| 2013/0036236 | A1* | 2/2013 | Morales | G06Q 30/0205 709/238 |
| 2015/0312424 | A1* | 10/2015 | Neethling | H04M 15/8027 455/406 |
| 2016/0217532 | A1 | 7/2016 | Slavin | |
| 2017/0257906 | A1* | 9/2017 | Gupta | H04W 36/0022 |
| 2017/0346833 | A1* | 11/2017 | Zhang | H04L 63/123 |
| 2018/0048738 | A1 | 2/2018 | Hinds | |
| 2018/0060835 | A1 | 3/2018 | Martin | |
| 2018/0109541 | A1 | 4/2018 | Gleichauf | |
| 2018/0124158 | A1* | 5/2018 | Amento | H04L 67/34 |
| 2018/0192461 | A1* | 7/2018 | Naik | H04M 1/725 |
| 2018/0199172 | A1* | 7/2018 | Boily | H04W 4/38 |
| 2018/0211524 | A1* | 7/2018 | Furuichi | G08G 1/096716 |
| 2018/0324157 | A1 | 11/2018 | Piqueras Jover et al. | |
| 2018/0337769 | A1 | 11/2018 | Gleichauf | |
| 2018/0343052 | A1* | 11/2018 | Lv | H04W 4/38 |
| 2019/0036906 | A1* | 1/2019 | Biyani | H04L 9/3236 |
| 2019/0124507 | A1* | 4/2019 | Dotchkoff | H04L 63/083 |
| 2019/0182030 | A1* | 6/2019 | Jo | H04L 9/3239 |
| 2019/0349426 | A1 | 11/2019 | Smith et al. | |
| 2019/0386832 | A1 | 12/2019 | Palyutina et al. | |
| 2020/0118068 | A1* | 4/2020 | Turetsky | G06Q 20/06 |
| 2020/0162263 | A1 | 5/2020 | Iyer | |
| 2020/0167512 | A1 | 5/2020 | Chitra et al. | |
| 2020/0278963 | A1* | 9/2020 | Destefanis | H04L 67/1093 |
| 2020/0323030 | A1* | 10/2020 | Mehta | H04L 67/104 |

OTHER PUBLICATIONS

Microchip ECC508A. http://microchip.com/wwwproducts/en/ATECC508A.

Microsoft Azure IoT Hub. http://azure.microsoft.com/en-us/services/iot-hub/.

Roughtime. http://roughtime.googlesource.com/roughtime/.

Sompolinsky et al. Secure high-rate transaction processing in bitcoin. School of Engineering and Computer Science, The Hebrew University of Jerusalem, Israel; Microsoft Research 1-20.

Co-pending U.S. Appl. No. 16/837,295, inventors Haleem; Amir et al., filed Apr. 1, 2020.

Dai et al., Blockchain for Internet of Things: A Survey, in IEEE Internet of Things Journal, vol. 6, No. 5, pp. 8076-8094, Oct. 2019, doi: 10.1109/JIOT.2019.2920987. (Year: 2019).

Kuo, et al., Potential Applicability of Distributed Ledger to Wireless Networking Technologies, in IEEE Wireless Communications, vol. 25, No. 4, pp. 4-6, Aug. 2018, doi: 10.1109/MWC.2018.8454517. (Year: 2018).

Ling, et al., Blockchain Radio Access Network (B-RAN): Towards Decentralized Secure Radio Access Paradigm, in IEEE Access, vol. 7, pp. 9714-9723, 2019, doi: 10.1109/ACCESS.2018.2890557. (Year: 2019).

Makhdoom, et al., Blockchain's adoption in IoT: The challenges, and a way forward. Journal of Network and Computer Applications, vol. 125; 2019, pp. 251-279, ISSN 1084-8045; https://doi.org/10.1016/j.jnca.2018.10.019. (Year: 2019).

Messie, et al., "BALAdIN for blockchain-based 5G networks," 2019 22nd Conference on Innovation in Clouds, Internet and Networks and Workshops (ICIN), Paris, France, 2019, pp. 201-205, doi: 10.1109/ICIN.2019.8685867. (Year: 2019).

Reyna, et al., On blockchain and its integration with IoT. Challenges and opportunities; Future Generation Computer Systems, vol. 88; 2018, pp. 173-190; ISSN 0167-739X; ttps://doi.org/10.1016/j.future.2018.05.046. (Year: 2018).

U.S. Appl. No. 62/613,364, inventors Haleem; Amir et al., filed Jan. 3, 2018.

U.S. Appl. No. 16/837,295 Notice of Allowance dated Oct. 27, 2020.

Co-pending U.S. Appl. No. 17/152,135, inventors Haleem; Amir et al., filed Jan. 19, 2021.

U.S. Appl. No. 16/837,295 Notice of Allowance dated Feb. 2, 2021.

\* cited by examiner

SYSTEMS AND METHODS FOR PROVIDING AND USING A DECENTRALIZED WIRELESS NETWORK

CROSS-REFERENCE

This application claims priority to U.S. Provisional Patent Application No. 62/613,364, filed Jan. 3, 2018, which is entirely incorporated herein by reference.

BACKGROUND

Despite the collective efforts of many well-funded companies, it is still difficult to develop and deploy connected sensing applications. Today nearly 75% percent of Internet of Things (IoT) projects fail due to the difficulty to connect embedded devices and sensors to the Internet. IoT applications, which are projected to generate over $11.1 trillion in economic value in under 10 years, need networks that are ubiquitous and/or decentralized in nature. In such a network, users should expect to turn on a device and have it just work. Traditional networks, such as cellular networks, may not be well-suited for IoT applications because of issues in equipment cost, service cost, and/or battery life. Therefore, there is a need for a new type of decentralized wireless network particularly designed for low power devices.

SUMMARY

Disclosed herein are systems and methods for providing and using a decentralized network using a blockchain.

In one aspect, disclosed herein is a method for providing access to a wide area network (WAN) via decentralized networking. The method may comprise: determining a target node from a plurality of nodes of the network to be mined by a selected node, wherein the target node is determined based on a history of trustiness of the target node; validating, by the selected node, reality of the target node based at least in part on a geographic location of the target node or a time of the target node; verifying, by one or more verifier nodes of the network, the reality validated by the selected node by repeating (b) and generate a score associated with the verification; and receiving a token, by the selected node, based on the score.

The decentralized network can provide WAN (e.g., internet) access to wireless devices (e.g., sensors, smart devices) via a low power wide area wireless radio frequency (RF) networking system provided by a group of independent providers. The low power wide area network can allow these wireless devices to be cost effective and power efficient, and to be used in various IoT applications. In some cases, the RF network is more power efficient and has longer range coverage than Wifi; it is more power efficient than cellular technologies and does not rely on a centralized service carrier; and it has a much longer range than bluetooth and does not require complicated pairing and provisioning. Combined with blockchain technology, the decentralized network can deliver highly secure wireless connectivity at a lower cost than a network with a centralized provider.

Aspects of the invention are directed to a system for facilitating data transmission comprising: a verified and decentralized consensus network comprising a plurality of node, wherein at least one of the nodes is configured to: (a) determine a target node from the plurality of nodes to be verified; (b) verify the target node by validating a geographic location of the target node and a time of the target node; and (c) receive a token for verifying the target node.

In some embodiments, the target node is a gateway device that is capable of providing data transmission service. Optionally, the target node bridges one or more low power wireless devices to a wide area network. Optionally, the data transmission service is wireless data transmission. In some embodiments, the target node is determined based on a history of validation associated with the target node. Optionally, the target node is determined based on a score that is a function of a previous validation of the target node. Validating the time of the target node may comprise using a time synchronization protocol. Validating the geographic location of the target node may comprise triangulating the location of the target node with aid of multiple nodes located within pre-determined proximity of the target node. In some embodiments, at least one node is configured to further select one or more nodes from the network of nodes for verifying the geographic location of the target node or the time of the target node. A value of the token may be determined based on a result of validating and verifying the geographic location of the target node or the time of the target node. A value of the token may be determined based on a density of the plurality of nodes of the network. In some embodiments, the at least one node is configured to further record a result of verifying the target node in a block of the blockchain.

Additionally, aspects of the invention may be directed to a method for facilitating data transmission among a decentralized, wide area network of low power wireless devices, the method comprising: identifying a node for providing network coverage to one or more low power wireless devices; mining, by one or more gateway nodes, one or more blocks by validating an integrity of the node; determining a winning block from the one or more blocks to be added to a block chain; and determining a value of a token associated with mining the winning block.

In some embodiments, the node is a gateway to a wide area network. Optionally, validating the integrity of the node comprises proofing a geographic location of the node or a time of the node. The node may be identified based on a history of validation associated with the node. The method may further comprise determining a score indicating a quality of an associated block. The winning block may be the block with the highest score among the one or more blocks. The score may be dynamically determined based on a validation history of the node and a validation history of the one or more gateway nodes. The method may further comprise determining a second value of the token associated with providing network coverage to the one or more low power wireless devices by the node.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Overview

Disclosed herein are systems and methods for providing and using a decentralized network. Data transmission among nodes of the network may be managed and enabled using blockchain technology with a native token. In some embodiments, the native token may relate to the data transmission service provided by one or more nodes of the decentralized network. The decentralized network may be a blockchain consensus network comprising a plurality of nodes each of which may be cryptographically verified in terms of physical location and/or time of the node. In some cases, the decentralized network may be, in particular, designed for low power devices. In some cases, a low power device may be devices with low data rate, such as sensors, actuators, Bluetooth devices, infrared devices, WiFi devices, optical devices, meters, on-street lighting control, precision agriculture controller and the like, or devices that perform simple processing at low power. In some cases, a low power device may not be a gateway node that interacts with a wide area network (e.g., Internet) directly.

Figure 1:
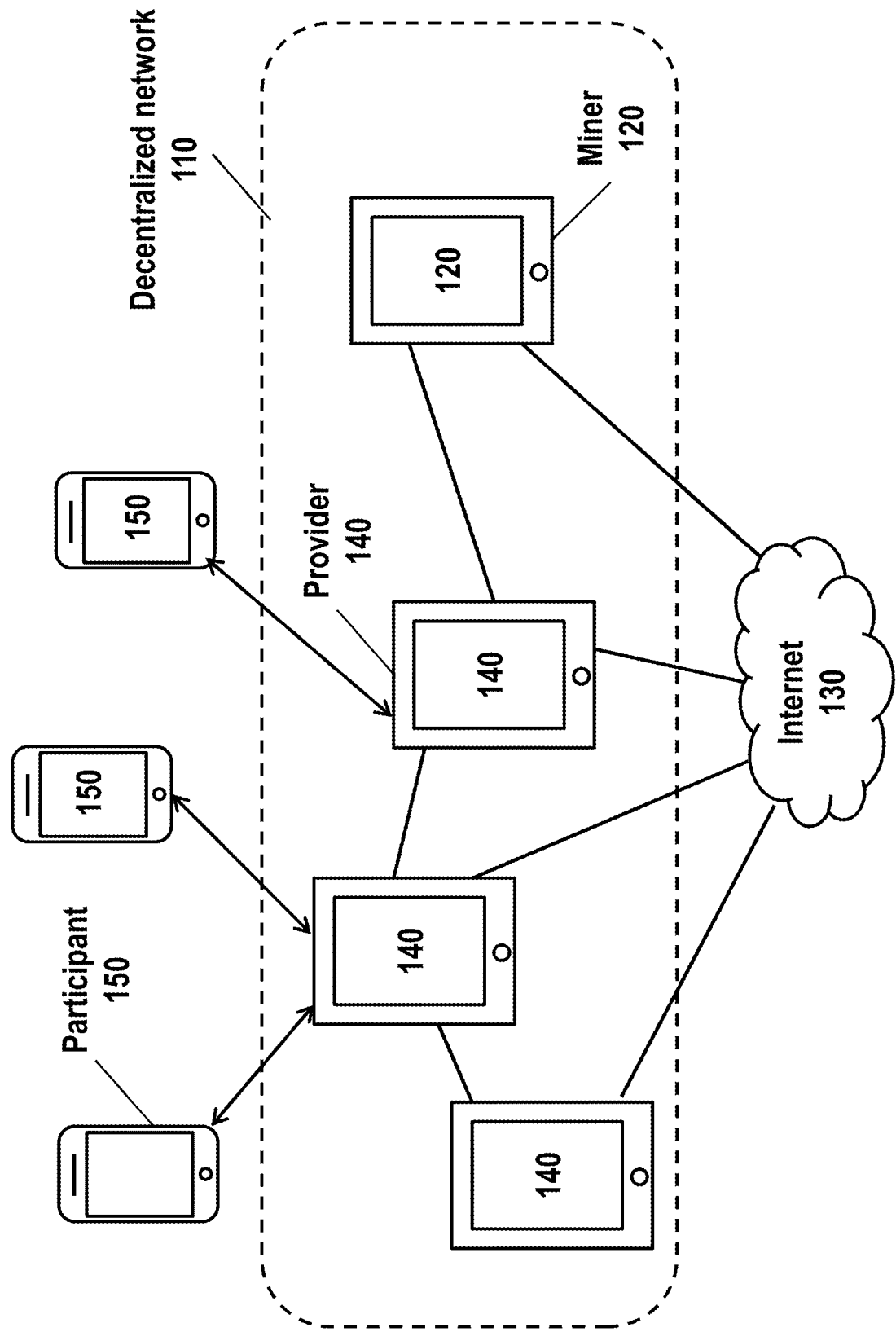
FIG. 1 shows an overview of an exemplary decentralized network in accordance with various embodiments of the invention.

FIG. 1 shows an exemplary decentralized network 110, in accordance with various embodiments of the invention. The decentralized network 110 may comprise one or more providers 140 and miners 120 configured to provide connection between participant 150, and a wide area network (e.g., Internet 130) thereby providing network coverage to one or more participants 150. In some cases, network coverage provided by the providers may be managed and verified using blockchain technology and a proof-of-work scheme.

In some embodiments of the invention, the decentralized network may be used to connect devices to a wide area network such as Internet. In some cases, such devices may be low power devices. In some cases, the devices may be non-TCP/IP devices. For example, the decentralized network may serve to bring internet connectivity to sensors, actuators, and other devices without these compromises. In some embodiments, the decentralized network may be used to connect any subnet or local network to a wide area network there by providing a wide range of communication with improved flexibility and lower cost.

In some embodiments, the decentralized network 110 may be a wireless network. In some cases, the decentralized network may comprise a plurality of nodes. In preferred embodiments, the plurality of nodes may be independent nodes that form the network 110 without a central coordinator. In some cases, at least a portion of the nodes may each be capable of accessing a wide area network. The nodes may comprise hardware, software, or a combination of both that is capable of accessing the wide area network (e.g., Internet). For instance, a node may comprise or be coupled to a gateway device such as a modem, hub, bridge, switch, router, server, workstation, desktop computer, laptop computer, tablet, mobile phone, desk phone, wearable device, or other network or electronic device. The gateway device may be physical, virtual or a combination of both. A node may comprise or be coupled to software or application for directing network traffic. A node may be substantially static or mobile. Details about the gateway device and the application are described later herein.

In some cases, the independent nodes of the decentralized network 110 may be or be operated by providers. The providers may provide network access to one or more low power devices that may not be capable of accessing the network directly. In some cases, the providers may provide data transmission services such as network coverage to the low power devices. In some embodiments of the invention, trustiness of the network coverage or data transmission service may be proofed and/or managed using blockchain and proof-of-work scheme. Details about the blockchain and the proof-of-work scheme are described later herein.

The wireless network may be a wide-area wireless radio frequency (RF) network, which can be combined with a blockchain and/or a token. The blockchain may run on one or more proofs that are indented to proof reality of a provider (e.g., proof of physical location or time), where blocks can be created by miners 120 who can provide physical RF network coverage in a cryptographically verified physical location and/or time. In some embodiments, the wireless network may be a Decentralized Low Power Wide Area Network (DLPWAN) implementation.

In some embodiments of the invention, the systems and methods may provide a bi-directional data transfer between wireless RF devices and the Internet 130 via a network of independent providers 140 that may not rely on a single coordinator. Alternatively or additionally, the data transmission may be one way such as a downlink or an uplink.

In some cases, at least some of the participants may seek for access to a network (e.g., Internet) or a network coverage. The participants may not be capable of connecting to the network directly. Participants 150 may pay (e.g., tokens) for the data transmission such as sending data or receiving data. Participants may pay for various other services or information provided by the providers such as identifying a geolocation of themselves. Participants 150 in the DLPWAN may use end node hardware to send and receive data via a distributed and decentralized network 110 of gateway devices operated by providers 140. In some cases, participants 150 may specify the price they are willing to pay for data transmission such as Internet coverage, message delivery, or other information such as geolocation.

Providers 140 may earn tokens by providing network coverage. Providers 140 may operate gateway devices on the network that can create wireless network coverage and/or mine blocks for the blockchain. Providers 140 may specify the token price they are willing to accept for data transmission such as Internet coverage, message delivery, or other information such as geolocation.

Providers 140 may provide wireless network coverage, such as long range RF wireless coverage (e.g., DLPWAN), via the gateway devices. In some cases, providers 140 may provide narrowband wireless network coverage. As an example, providers 140 may provide 900 MHz wireless network coverage, a 2.4 GHz wireless network coverage, a 60 GHz wireless network coverage. The bandwidth of the data transmission links between the gateway and the participant device may be in a range from about 10 Kbps to about 1M bps or any range below 10 Kbps or any range above 1 Mbps. These gateway devices may allow long range communications and each can support many participants 150 (e.g., end nodes) on the network. In some cases, the gateway devices may have an operating range of at least one kilometer. The gateway devices may employ any suitable coding or modulation scheme such as binary shift keying (BSK), direct sequence spread spectrum (DSSS), frequency hopping spread spectrum, or Gauss frequency-shift keying (GFSK), Quadrature Amplitude Modulation (QAM) or quadrature phase shift keying (QPSK), power amplification, forward error correction (FEC) and various other data transmission methods. In some cases, the gateway devices may switch power amplification, bandwidth, and/or bitrate in real-time to optimize for signal quality, transmission rate, and/or battery life.

The data transmission or communication links provided by the providers may or may not have the same characteristics across the providers. In some cases, different communication links may have different characteristics such as noise, interference, signal-to-noise ratio, bit error rate, fading rate or bandwidth. In some cases, these characteristics may influence the price negotiated between a provider and a participant.

Miners 120 may earn tokens from transactions that take place across the network. Miners 120 may earn tokens by validating the integrity of the network. For example, miners 120 may participate in the creation of new blocks for the underlying blockchain by verifying that other providers 140 on the network are acting honestly. In some cases, the providers may be verified using a scheme (e.g., Proof-of-Reality) to proof one or more properties of the provider such as physical location or time of the provider. The provided system and/or method may not require a miner to mine blocks by computing complicated hashes thereby improving the efficiency of a mining process.

A node can be a miner, a provider or both. In some cases, miners may also earn tokens by acting like a provider such as providing network coverage or by routing data to the desired Internet endpoint. In some cases, a provider 140 may become a miner 120 when it attempts to use its gateway to mine a new block. In some cases, a miner 120 can become a provider 140 when it attempts to provide network coverage.

In preferred embodiments of the invention, the token may be a native token that is not rely on other assets or currency forms. For example, the token may correspond to the network coverage provided by other providers of the network. In some cases, a value of a token or an amount of a token may correspond to a certain amount of time of network coverage provided by a provider at certain transmission rate or regardless of transmission rate. In some cases, a value of a token or an amount of a token may correspond to the total amount of data being transmitted, such as sending or receiving data between the end node and Internet.

The token can be used by participants 150 to pay providers 140, in order to transmit and receive data, or provide other services such as to geolocate themselves. The amount of token required for transmitting and receiving data, and/or geolocating themselves can be negotiated via an automated bidding process. Alternatively or in addition to, the amount of token may be pre-determined or determined using any other suitable methods.

The token may be traded on exchanges and/or stored with various wallets. For example, the token can be exchanged for other currencies such as Bitcoin (BTC), Ethereum (ETH), and the United States dollar (USD). In some cases, the token may expire or have a limited life. The half-life of the token block rewards can be set from about 1 to about 20 years, for example, from about 1 to about 2 years, from about 1 to about 3 years, from about 1 to about 4 years, from about 1 to about 5 years, from about 1 to about 10 years, from about 1 to about 15 years, from about 1 to about 20 years, from about 2 to about 3 years, from about 2 to about 4 years, from about 2 to about 5 years, from about 2 to about 10 years, from about 2 to about 15 years, from about 2 to about 20 years, from about 3 to about 4 years, from about 3 to about 5 years, from about 3 to about 10 years, from about 3 to about 15 years, from about 3 to about 20 years, from about 4 to about 5 years, from about 4 to about 10 years, from about 4 to about 15 years, from about 4 to about 20 years, from about 5 to about 10 years, from about 5 to about 15 years, from about 5 to about 20 years, from about 10 to about 15 years, from about 10 to about 20 years, or from about 15 to about 20 years. For instance, the half-life of the token block rewards can be set at 6 years.

Blockchain Protocol

The decentralized network disclosed herein may be achieved by employing blockchain technology. A blockchain is a secure and distributed ledger of transactions. A blockchain is a data structure that stores a list of transactions, forming a distributed electronic ledger that records transactions between source identifiers and destination identifiers. The transactions are bundled into blocks and every block (except for the first block) refers back to or is linked to a prior block in the chain. Computer nodes maintain the blockchain and validate each new block and the transactions contained therein. The integrity (e.g., confidence that a previously recorded transaction has not been modified) of the entire blockchain is maintained because each block refers to or includes a cryptographic hash value of the prior block. Accordingly, once a block refers to a prior block, it becomes difficult to modify or tamper with the data (e.g., the transactions) contained therein. This is because even a small modification to the data will affect the hash value of the entire block. Each additional block increases the difficulty of tampering with the contents of an earlier block. Thus, even though the contents of a blockchain may be available for all to see, they become practically immutable.

The provided blockchains and/or Proof-of-Work schemes may be used to help create consensus among many distributed and potentially untrusted parties. The Proof-of-Work scheme of the provided method may be computationally inexpensive. According to the provided blockchain protocol, a miner may mine a block by proofing reality of a provider rather than solving complicated puzzles (i.e., hashes). The provided method may allow for a mining process with improved efficiency. For instance, based on the provided blockchain protocol and Proof-of-Work scheme, a block can be mined every 0.1-20 minutes, for example from 0.1 to 0.2, from 0.2 to 0.4, from 0.4 to 0.6, from 0.6 to 0.8, from 0.8 to 1, from 1 to 2, from 2 to 4, from 4 to 6, from 6 to 8, or from 8 to 10, from 10 to 12, from 12 to 14, from 14 to 16, from 16 to 18, or from 18 to 20 minutes. In some cases, each block can be mined every 1 minute or less.

Blockchains as provided herein may be used to prove that nodes in the network exist in the physical geography or space that they claim, provide a cost-effective way to run application logic core to the operation of a DLPWAN, and/or also furnish a machine-to-machine micro-transaction system.

The systems and methods may register participant hardware public keys to the blockchain, and establish a root of trust for devices on the network. The systems and methods may facilitate participant provisioning and addressing by application logic built into the blockchain. In some cases, the systems and methods may store participants' Internet routing information (e.g., Transmission Control Protocol/Internet Protocol—TCP/IP) in the blockchain. In some cases, the systems and methods may facilitate the transactions between participants and providers securely and/or honestly without human intervention. The systems and methods can minimize transaction costs and/or clearing times.

Structure of a Blockchain

Figure 2:
FIG. 2 shows a structure of an exemplary block in the blockchain in accordance with various embodiments of the invention.

A blockchain may comprise one or more blocks. A block may contain a header and a list of transactions. In some embodiments, a block may further comprise information related to time of the block being created/verified and link to a previous block. FIG. 2 shows an exemplary block structure 200, in accordance with embodiments of the invention. As shown in FIG. 2, a block 200 in the blockchain may comprise cryptographic timestamp, previous block hash, Merkle root, previous transactions (e.g., transactions 1 . . . n), Proof-of-Work hash and signatures, or any combination thereof. In some cases, the blockchain may comprise a summary of all the transactions in the block.

Various different transactions can be included in a block. For example, the transactions may be coinbase transaction such as a transaction for mining rewards. The transactions may relate to various actions or events such as creation of state channel for micro-transactions, exchange of tokens between entities, providers and/or participants joining the network, providers and/or participants changing their location and various other transactions. In some cases, the coinbase transaction can be the first transaction in a block.

The blockchain may comprise a hash of previous blocks in the chain, a set of transactions, and/or a Proof-of-Work. For example, the first transaction can be a coinbase transaction, which can be a miner claiming a reward based on the mining reward scheme. Once there are a significant number of participants and transactions on the network, the mining reward may be expired and miners may earn tokens as a result of transaction fees between participants and providers.

Figure 3:
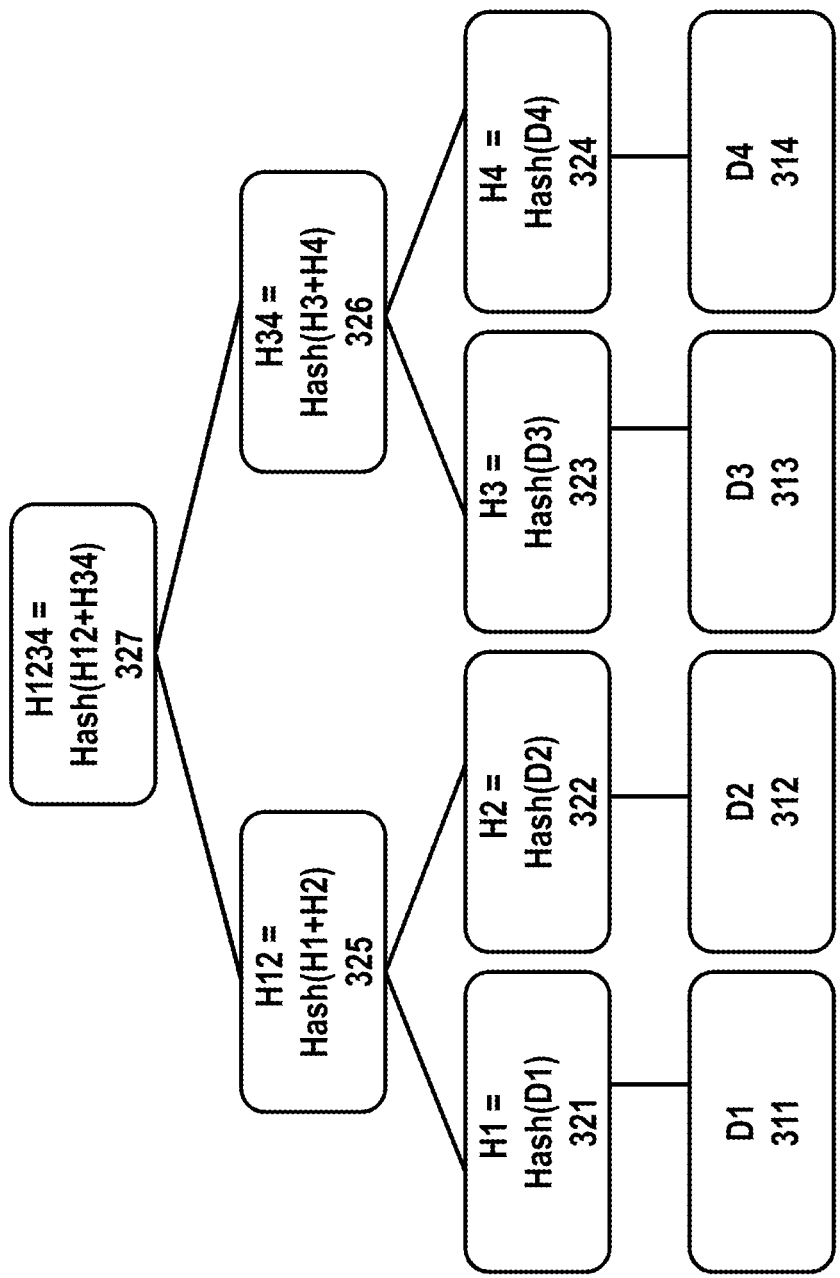
FIG. 3 shows a structure of an exemplary Merkle tree in accordance with various embodiments of the invention.

The blockchain may use a Merkle tree. The Merkle tree may be a hash tree. The Merkle tree can be a binary hash tree. The Merkle tree is a data structure that can be used for efficient and secure verification of the contents of large data structures. As shown in an example in FIG. 3, a Merkle tree can be a tree in which every leaf node 311-314 is labelled with a data block (e.g., D1-D4) and every non-leaf node 321-327 is labelled with the hash of the labels of its child nodes. For example, hashes H1 321, H2 322, H3 323, and H4 324 are the hash values of data blocks D1 311, D2 312, D3 313, and D4 314, respectively. In the same example, hash H12 325 is the hash of the concatenation of hashes H1 321 and H2 322 (the "+" sign in FIG. 3 denotes concatenation). Similarly, hash H34 326 is the hash of the concatenation of hashes H3 323 and H4 324. Likewise, hash H1234 327 is the hash of the concatenation of hashes H12 325 and H34 326.

The hash algorithms used in the blockchains disclosed herein can include cyclic redundancy checks, checksum functions, and cryptographic hash functions. In some cases, the hash algorithm can be a cyclic redundancy check such as BSD checksum, checksum, CRC-16, CRC-32, CRC-32 MPEG-2, CRC-64, or SYSV checksum. In some cases, the hash algorithm can be a checksums such as sum (Unix), sum8, sum16, sum24, sum32, fletcher-4, fletcher-8, fletcher-16, fletcher-32, Adler-32, xor8, Luhn algorithm, Verhoeff algorithm, or Damm algorithm. In some cases, the hash algorithm can be a universal hash function such as Zobrist hashing, universal one-way hash function, tabulation hashing, or Rabin fingerprint. In some cases, the hash algorithm can be a non-cryptographic hash function such as Pearson hashing, Paul Hsieh's SuperFastHash, Buzhash, Fowler-Noll-Vo hash function (FNV Hash), Jenkins hash function, Java hashCode( ), Bernstein hash djb2, PJW hash/Elf Hash, MurmurHash, SpookyHash, CityHash, numeric hash (nhash), xxHash, HighwayHash, t1ha (Fast Positive Hash), or jodyhash. In some cases, the hash algorithm can be a keyed cryptographic hash function such as VMAC, UMAC, BLAKE2, Poly 1305-AES, PMAC (cryptography), SipHash, One-key MAC, MD6, or HMAC. In some cases, the hash algorithm can be a unkeyed cryptographic hash function such as BLAKE-256, BLAKE-512, BLAKE2s, BLAKE2b, ECOH, FSB, GOST, Grøstl, HAS-160, HAVAL, JH, MD2, MD4, MD5, MD6, RadioGatún, RIPEMD, RIPEMD-128, RIPEMD-160, RIPEMD-320, SHA-1, SHA-224, SHA-256, SHA-384, SHA-512, SHA-3, Skein, Snefru, Spectral Hash, Streebog, SWIFFT, Tiger, or Whirlpool.

Mining

Providers 140 may compete to mine a new block (e.g., as a miner 120). In some cases, providers 140 may compete to mine a new block at a fixed time interval. The fixed time interval can be less than 24 hours, for example, less than 12 hours, 6 hours, 2 hours, 1 hour, 30 minutes, 10 minutes, 1 minute, 30 seconds, 10 seconds, 3 seconds, 2 seconds, 1 second, 0.1 seconds, 0.01 seconds, 0.001 seconds, 0.0001 seconds, 0.00001 seconds, or 0.000001 seconds. The fixed time interval can be more than 1 second, for example, more than 2 seconds, 3 seconds, 10 seconds, 30 seconds, 1 minute, 10 minutes, 30 minutes, 1 hour, 2 hours, 6 hours, 12 hours, 24 hours, 48 hours, or 72 hours. The fixed time interval can be from 0.000001 seconds to 72 hours, for example, from 0.000001 seconds to 1 second, from 0.1 seconds to 1 minute, from 30 seconds to 10 minutes, from 1 minute to 1 hour, from 30 minutes to 12 hours, from 6 hours to 24 hours, or from 12 hours to 72 hours. In some cases, providers can compete to mine a new block at a variable time interval. The provider 140 can record new transactions to the blockchain and/or can validate that one or more other provider's gateways on the network are acting honestly via the Proof-of-Reality scheme.

In some embodiments of the invention, a target or multiple targets may be selected for a miner. A target may refer to a target provider selected for a miner to validate. Various mechanisms can be used for determining a target. In some cases, a provider with less reliability or trustiness may have a greater chance to be selected as target based on the mechanism. In some embodiments, a target may be selected based on a quality score indicating the reliability or trustiness of a provider. For instance, higher score may indicate higher trustiness. The quality score may be determined based on one or more factors. In some cases, the quality score may be determined based on the number of providers in the same geographical area, for example, the quality score may decrease as the number of providers in the same geographical area increases. In some cases, the quality score may be determined based on the last time the provider was validated, for example, the quality score may decrease as the time that the provider is not validated increases. In some cases, the quality score may be determined based on the history of successful validations, for example, the quality score may increase as the number of successful validations by the provider increases. If the quality score of the gateway is lower than a threshold score, it may not be able to participate in the mining process. The quality score may a function of a previous validation of the gateway.

Figure 4:
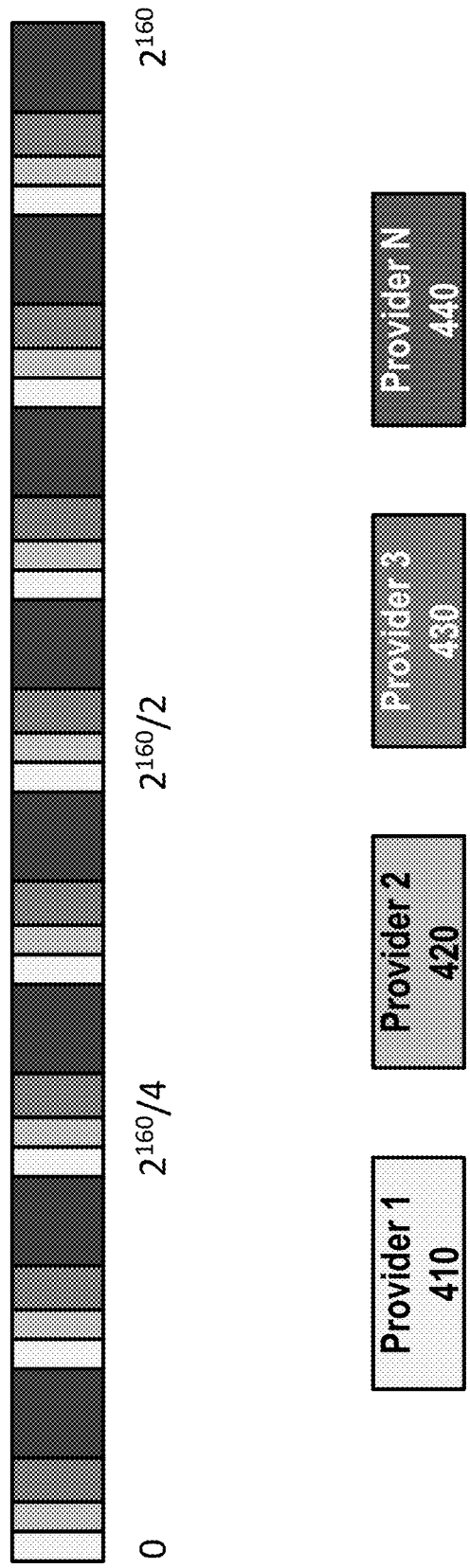
FIG. 4 shows an exemplary mechanism for selecting a target in accordance with various embodiments of the invention.

FIG. 4 shows an exemplary mechanism for selecting a target for mining. A provider may be selected from a plurality of providers as a target for a miner. In some cases, a block and a provider may be uniquely identified by a hash value. The hash value may be generated by hashing a previous block hash along with the provider's gateway address (e.g., IP address). The hash value can be generated using any other suitable information that may be uniquely associated with the block and the provider. For example, a gateway attempting to mine a block, for example as a miner 120, may hash a previous block hash along with its own network address. The hash may yield an integer in a pre-defined range such as a $2^{160}$ range. The range can be any other value greater than or smaller than $2^{160}$. Then the miner 120 may project a list of other gateways, for example, in a deterministic way, and map it onto the same $2^{160}$ range. This may allow the miner 120 to automatically have a target or a set of targets selected for them via a mechanism that would be very difficult to influence in their favor.

As mentioned above, provider gateways 140 may be allocated a quality score. In some cases, the quality score may decrease as additional blocks are mined within which they are not validated. In some cases, gateways with lower scores may be allocated a larger proportion of the pre-defined range (e.g., $2^{160}$ range) to increase the chances they get audited in the mining process. As shown in the example in FIG. 4, provider 1 410, provider 2 420, provider 3 430, and provider N 440, are each allocated a quality score. Among them, provider 2 420 has the highest quality score, while provider N 440 has the lowest quality score. Accordingly, provider 2 420 is assigned the smallest proportion in the $2^{160}$ range, while provider N 440 is assigned the largest proportion and has the highest chance of being audited in the mining process. Additionally, in some cases, gateways with a quality score below a certain threshold can be ineligible to compete in the mining process.

Figure 5:
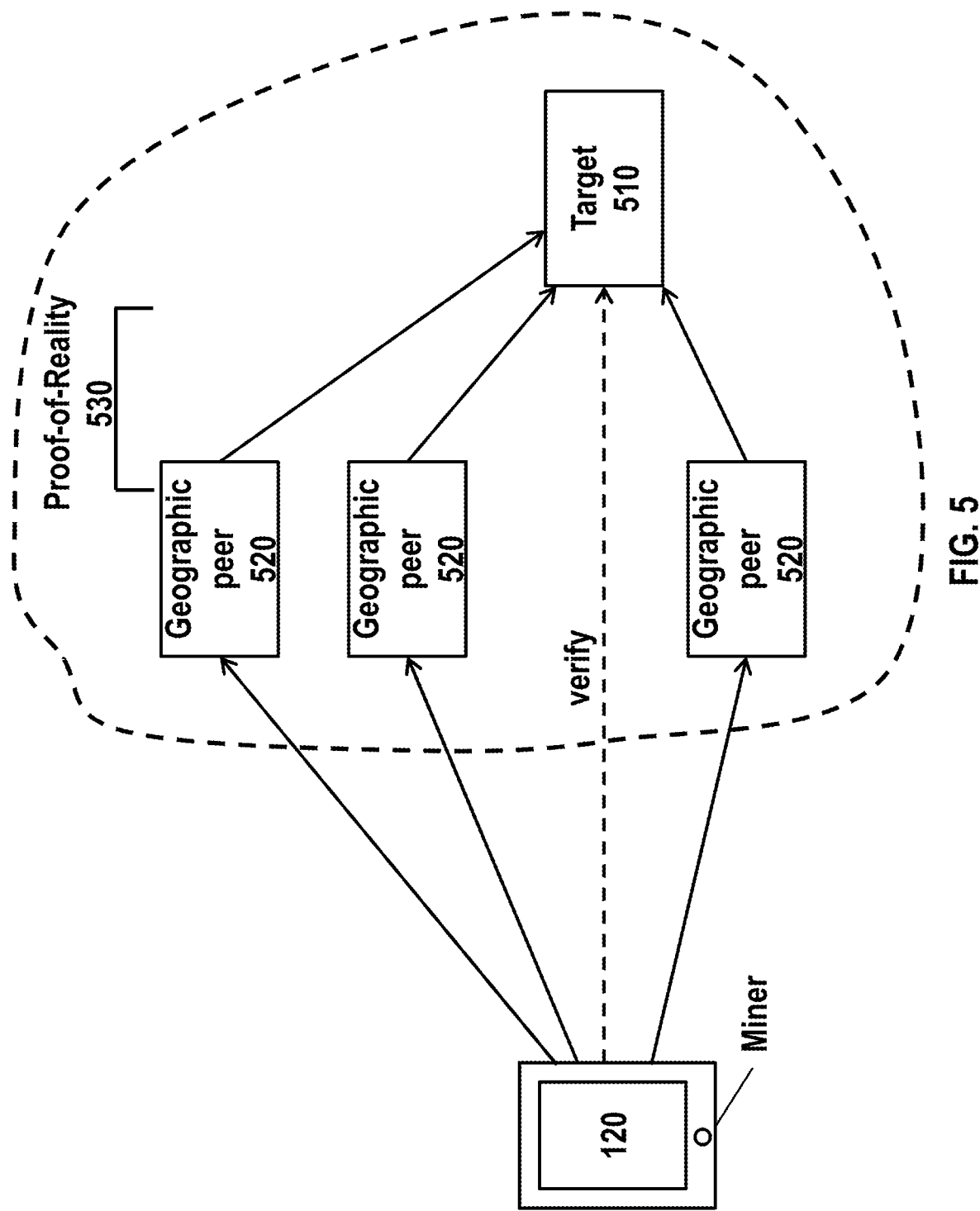
FIG. 5 shows an example of a miner validating its target.

Once a miner has determined one or more targets for this block, it may then validate them. In some embodiments, a target may be validated in terms of its reality. In some cases, physical locations or time of the target may be validated. FIG. 5 shows an example of validating a target 510, in accordance with embodiments of the invention. In some cases, if one or more targets to be validated are offline or no target is identified, there may not be work to be performed and the miner 120 may not mine this block. In some cases, if the miner 120 has a valid target 510 to validate which is determined using the method described in FIG. 4, it may request information from that target 510 and its geographic peers 520 using a pre-determined scheme.

In some embodiments, the pre-determined scheme may be Proof-of-Reality scheme 530. The Proof-of-Reality may require geographic proximity between the target 510 and its geographic peers 520. Because the miner 120 and target 510 can be anywhere in the network, the geographic peers 520 may be available to validate the target 510 in some cases (for example in FIG. 5), and/or the geographic peers 520 may be unavailable to validate the target 510 in other cases. The one or more geographic peers 520 may be nodes or providers of the network. The one or more geographic peers 520 may be associated with a gateway with a geolocation within a range of the target 510. For example, the gateways may have a geolocation within at least about 50 meters, 75 meters, 100 meters, 125 meters, 150 meters, 175 meters, 200 meters, 225 meters, 250 meters, 275 meters, 300 meters, 350 meters, 400 meters, 450 meters, 500 meters, 550 meters, 600 meters, 650 meters, 700 meters, 750 meters, 800 meters, 850 meters, 900 meters, 950 meters, 1 kilometers, 2 kilometers, 3 kilometers, 4 kilometers, 5 kilometers, 6 kilometers, 7 kilometers, 8 kilometers, 9 kilometers, 10 kilometers or more of the target's geolocation. The one or more geographic peers may validate the geolocation of the target using a proof-of-location method.

Proof-of-Location

The geolocation of the target can be proofed using various methods. The methods may evolve over time with upgrades and/or forks. The methods may or may not require a GPS hardware. The methods may include, but not limited to, random number broadcast, spectral scan comparison, global positioning system (GPS) location, TCP/IP Proof-of-Connectivity, network latency analysis, or any combinations thereof.

In some cases, random number broadcast can be used for Proof-of-Location. For example, a miner 120 can request nearby geographic peers 520 to emit packets with a secret payload, derived from the Proof-of-Time, and require the target 510 to prove that it has received them. Similarly, the miner 120 can request the target 510 to emit a packet and use RF time differential of arrival (the travel time of a radio signal from a single a geographic peers to the target) from geographic peers 520 to validate the GPS location.

In some cases, spectral scan comparison can be used for Proof-of-Location. For example, a spectral span comparison can be used to verify common RF data, in raw samples and/or by observing a known data stream (e.g., GPS messages). In some cases, raw RF samples and/or GPS messages observed from nearby locations can have correlation. The target 510 can compare its own RF spectral scan with that of its geographic peers 520. In some cases, for example, where there are limited geographic peers 520, longer range signals, such as frequency modulation (FM) or amplitude modulation (AM) radio, can be used as correlation.

In some cases, GPS location can be used for Proof-of-Location. For example, a National Marine Electronics Association (NMEA) message output from a GPS or Global Navigation Satellite System (GNSS) receiver can be used as one of the methods to prove the location of a target 510. In some cases, because it is easy to fabricate a NMEA message, GPS location may be used in combination with other methods.

In some cases, TCP/IP Proof-of-Connectivity can be used for Proof-of-Location. For example, the IP address of a target 510 can also be used for Proof-of-Location. In some cases, because Tor and VPNs can make IP addresses unreliable, TCP/IP Proof-of-Connectivity can be used in combination with other methods.

In some cases, network latency analysis can be used for Proof-of-Location. For example, a ping packet (e.g., Tor's onion routing) can be constructed that traverses a selected subset of nodes, including the target 510. Each node in the chain can remove the outermost layer of encryption, which indicates the next destination, sign and timestamp, and forward the packet. In some cases, the target 510 doesn't know if it is being validated or if it is just participating in another validation. If the target 510 tries to alter its latency to mask its true location, multiple onion pings, all intersecting the target at some point, can reveal the anomalies.

In some embodiments, validating a target may also comprise validating a time of the target. The method (e.g., proof-of-time method) for validating time can be used in conjunction with the proof-of-location method. For instance, a proof-of-location work may be signed by a cryptographically proven timestamp provided by the proof-of-time method. Details about the proof-of-time method are discussed later herein.

Any one or combination of the aforementioned methods may be used to validate the geolocation of the target. Multiple methods can be used to provide multiple dimensions of proof so that it is infeasible to forge all the aspects of proof required to make it profitable.

Figure 6:
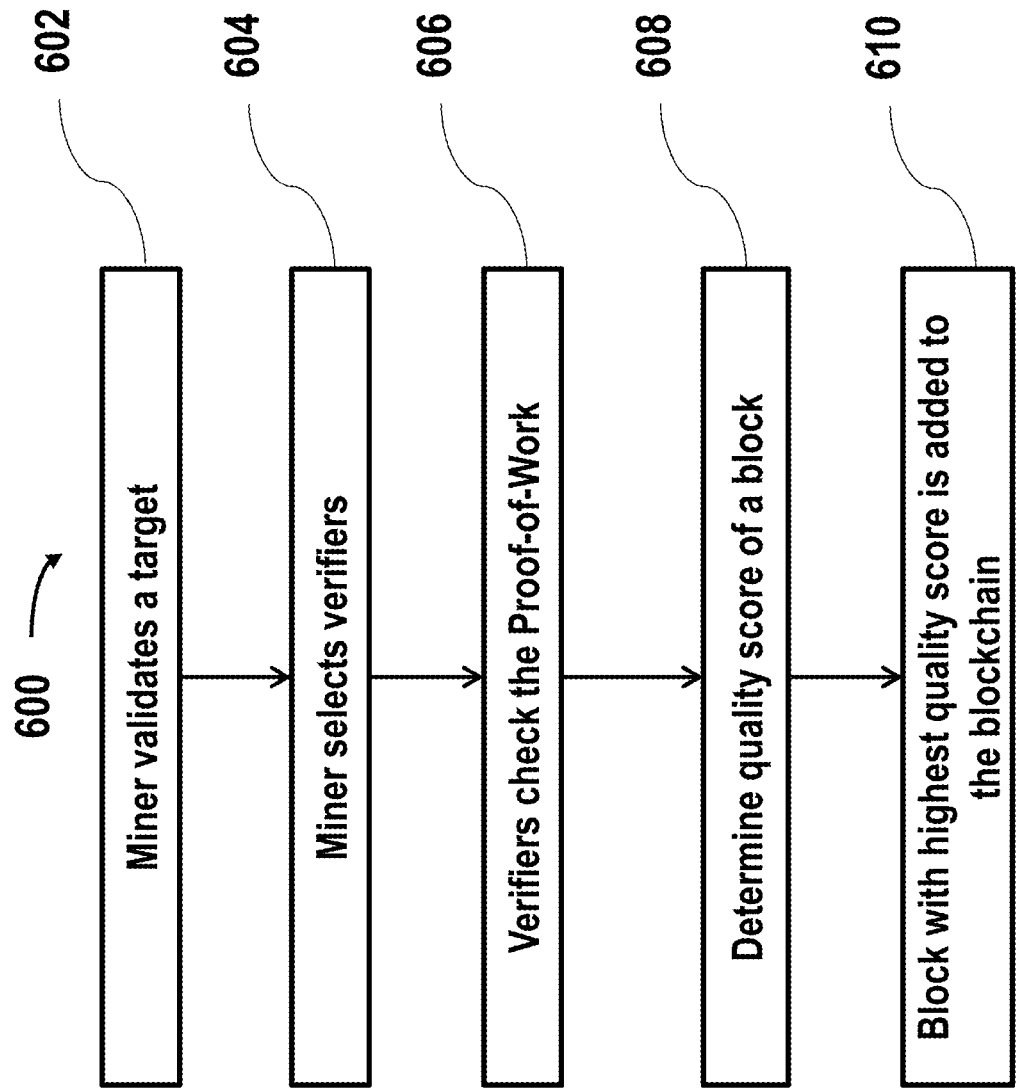
FIG. 6 shows an exemplary process of adding a block to the blockchain in accordance with various embodiments of the invention.

In some embodiments of the invention, the validation work performed by a miner may be further verified by one or more peer providers or verifiers. FIG. 6 shows an exemplary process 600 for verifying the work of a miner 120, in accordance with embodiments of the invention. The process 600 may begin once a validation is completed 602. The miner 120 may then select N peer providers, known as verifiers 610, to verify its work 604. The selection of verifiers 610 can be similar to the selection of the original target 510. In some cases, the miner 120 can deliver its evidence of honesty or dishonesty and/or ask the verifiers 610 to sign its work. In some cases, the verifiers 610 agree the Proof-of-Work is complete and the new block can be advertised to the blockchain.

In some cases, the verifiers 610 may check the Proof-of-Work by performing the same target selection using the same information the miner 120 used originally 606. The verifiers 610 may then verify the signatures using the published public keys for the miner 120, target 510 and geographic peers 520.

In some cases, the quality of the block can be calculated by combining the quality score of the miner 120 and the verifiers 610 and subtracting the quality score of the target 510, 608. Thus, validating a target gateway with a high quality score can be less valuable than validating a less trusted gateway. Additionally, because a reward is paid to the miner 120 for every block successfully added to the blockchain, miners 120 and verifiers 610 may want to have a high quality score themselves as it increases the chances of their block winning. In some cases, the highest quality block advertised to the network can be added to the blockchain 610. At this point, mining can begin again. Transactions not included in the new block can be added to the next block.

In some cases, a gateway that has not been validated for a long time may have a continuously diminishing quality score. If the quality score of the gateway is lower than a threshold score, it may not be able to participate in the mining process. Similarly, gateways providing incorrect and/or insufficient proof can also lose trust (e.g., quality score) over time.

The advantage of this mining technique can be to provide a useful Proof-of-Work that is not computationally expensive to create, is easy to verify, and/or provides value to the network. The mechanism can be resilient to most attacks because the miners 120 involved cannot control their targets 510 and verifiers 610, as it is a function of the blockchain. In most cases, a miner 120 may not be able to cheat on the validation of their targets 510 without the verifiers 610 rejecting it. Collusion may be difficult in this model, and a regional 51% attack can be impossible because the targets 510 and verifiers 610 can be from anywhere on the network.

The blockchain can enforce a time-based curve to reduce the amount of coinbase rewards generated over time. In some cases, the time-based curve can ensure such that the total amount of tokens in circulation reach a known and/or pre-determined limit. When the limit is reached, it can be expected that a self-sustaining economy of participants 150 transacting with providers 140 has been created.

Staking

In some cases, gateways on the network may stake a bond in order to participate in the mining process. In some cases, an amount of bound may be required in order to be eligible to participate in the mining process. In some cases, the amount of the bond required for participating in a mining process may be dynamic. In some cases, the amount of bond or stake fees may be dynamically determined to incentivize a better distribution/density of nodes or better topology of the network. For example, the amount of the bond required for participating in a mining process may be determined based on the geographic location and/or density of gateways within a region of the gateway. For instance, the amount of the bound may be a function of the geographic location and the density of other gateways within a distance from the gateway. For example, in regions with a high number of existing gateways, the amount of bound may be significantly higher. In another example, when a gateway changes location, the amount of bound required to maintain eligibility may change accordingly before that gateway is able to participate in the mining process.

In some cases, if a gateway's quality score falls below a certain threshold, the bond may be revoked, and the provider 140 may be required to stake a new bond if they wish for that gateway to participate in the mining process. In some cases, the new bond can be a higher amount than the previously revoked bond, for example, at least about 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, 350%, 400%, 450%, or 500% higher than the previously revoked bond.

One purpose of the system can be to prevent gateways from acting dishonestly by making it expensive to attempt to manipulate the network for profit. In some cases, if a dishonest actor intentionally locate itself in close physical proximity with others (such as in a warehouse), attempt to manipulate the mining process by way of collusion (such as a Sybil attack), or misrepresent elements of the Proof-of-Reality, the dishonest actor may carry a high risk and/or potential cost under this system. For example, the attacker in a Sybil attack can subvert the system of a network by creating a large number of pseudonymous identities, using them to gain a disproportionately large influence. However, the system described herein can prevent the Sybil attack by making it more expensive.

Uncle Blocks

High quality blocks that did not get chosen can be added to the chain as uncle blocks because, for instance, the network's Proof-of-Work is valuable to the network. In some cases, the system can use the Greedy Heaviest-Observed Sub-Tree (GHOST) algorithm (such as described in Sompolinsky, Yonatan and Zohar, Aviv. (2015). Secure High-Rate Transaction Processing in Bitcoin. 10.1007/978-3-662-47854-7_32) to create the uncle blocks. For example, uncle blocks can be implemented in systems such as Ethereum (ethereum.org). Uncle blocks may allow providers 140 to be paid a proportion of the reward even if their block did not become the tip of the chain. Uncle blocks can help incentivize providers 140 to submit mined blocks, even though they may not win, and allow the winning chain to accumulate 'weight' in terms of both the length and quality of the chain, but also including the amount and quality of uncle blocks. Under this system, longer chain forks, either mined maliciously or on the smaller side of a partitioned network, may not be selected over a shorter, weightier chain. Under this system, valuable Proof-of-Work may not be lost and can be used by the chain to calculate trust.

In some cases, the blockchain described herein, unlike many others, may not rely on the difficulty of mining. Instead, it may rely on the difficulty of composing a block that satisfies the peers on the network and/or has a high enough score. The contents of the genesis block (first block of a block chain) and/or the starting state of the network can be biased by initially deploying trusted gateways. It can be difficult to mine a forked chain that accurately referred back to the genesis block. Similarly, once the chain is established, it can be difficult for an attacker to acquire enough highly trusted gateways to steer the network onto a fork for instance because, barring a 51% attack (where those 51% are trusted gateways), all the honest gateways will not see their blocks as of higher quality than honestly constructed ones.

Proof-of-Reality

In some cases, rewards may be offered to providers 140 who can prove that they are providing network (RF network) coverage. The Proof-of-Work (e.g., proof-of-reality) may comprise proving that other providers 140 in the network are honest. For example, the Proof-of-Work may comprise verifying that other providers 140 are where they claim to be and/or that they are providing network coverage (e.g., radio coverage). It may involve several dimensions of proof and/or can involve probing nearby nodes or infrastructure for confirmation. In some embodiments, Proof-of-Work may be achieved by proof-of-reality of a provider. As aforementioned, proof-of-reality may comprise proofing the geolocation and time of a provider.

Figure 7:
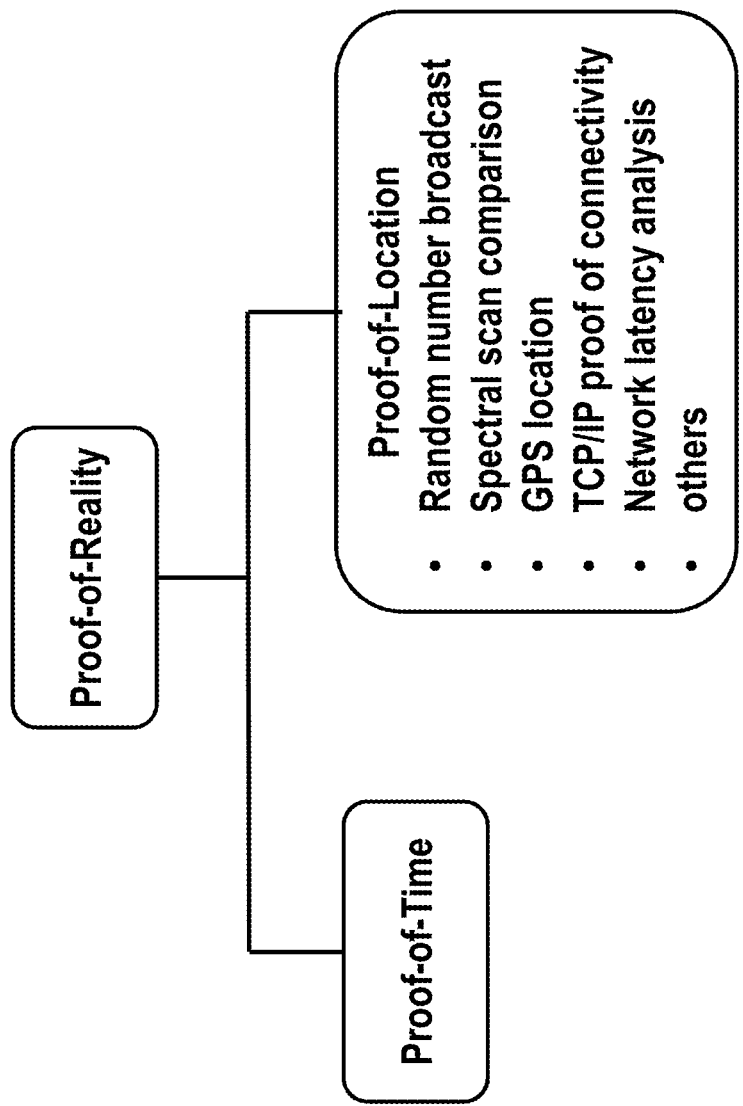
FIG. 7 shows an exemplary factors of the Proof-of-Reality, in accordance with various embodiments of the invention.

For example, as shown in FIG. 7, the Proof-of-Reality may comprise providing secure time synchronization (Proof-of-Time), verifying that providers 140 are providing network coverage at where they claim to be (Proof-of-Location).

Proof-of-Time

Time synchronization protocols can be used to achieve cryptographic consensus among decentralized clients. For example, roughtime (https://roughtime.googlesource.com/roughtime) or a simplified form thereof can be used to achieve cryptographic consensus among decentralized clients. Roughtime is a protocol that can achieve roughtime synchronization in a secure way that does not depend on any particular time server, and/or in such a way that, if a time server does misbehave, clients can end up with cryptographic proof of that behavior. Providers 140 in the network described herein, such as DLPWAN, can act as both roughtime servers and clients.

In one example, the time synchronization protocol used herein can achieve cryptographically secure time (e.g., via roughtime) as follows: a completely fresh client can generate a random nonce and sends it to a roughtime server. The reply from the server can include the current time, the client's nonce, and a signature of them both. If the server is completely trusted, the client can stop there; it knows that the reply from the server is fresh because it includes the nonce that the client generated. It knows that the reply is authentic because it has a signature from the server. But if it doesn't completely trust the server, it can ask another for the time. Due to the decentralized nature of the network protocol, no server can be completely trusted, so a second request to an additional server can be required.

For the second request, the client may generate its nonce by hashing the reply from the first server with a random value. This may prove that the nonce was created after the reply from the first server. It may send that to the second server and receive a signature from it covering that nonce and the time from the second server. When the times from the two servers are significantly different, for example, the time from the second server is before the first server, then the client can have proof of misbehavior; the reply from the second server can implicitly show that it was created later because of the way that the client constructed the nonce. If the time from the second server is after the first server, then the client may contact the first server again and get a signature that was provably created afterwards, but with an earlier timestamp.

With only two servers, the client may end up with proof that something is wrong, but may not know what the correct time is. But with half a dozen or more independent servers, the client may have a chain of proof of any server's misbehavior, signed by several others servers, and enough accurate replies to establish what the correct time is.

Proof-of-time can be used in conjunction with proof-of-geolocation method as described above. For example, the proof-of-geolocation methods may include random number broadcast, spectral scan comparison, global positioning system (GPS) location, TCP/IP Proof-of-Connectivity, Network latency analysis, or any combinations thereof as described elsewhere herein.

These proof-of-geolocation methods can be anchored using Proof-of-Time, for example, one or more of these methods are signed by a cryptographically proven timestamp. This can add another layer of verification to the proving methods, as accurately falsifying a combination of these techniques as well as a cryptographic timestamp is unlikely.

Decentralized Network

In one aspect, disclosed herein is a Decentralized Low Power Wide Area Network (DLPWAN). DLPWANs may be configured to provide a bridge between low power non-TCP/IP devices and the TCP/IP based Internet by way of multiple independent providers, and can also outline a protocol specification by which devices using such a network should conform. Routing and coordination, for instance in DLP-WAN, is decentralized and does not require any trusted parties.

Figure 8:
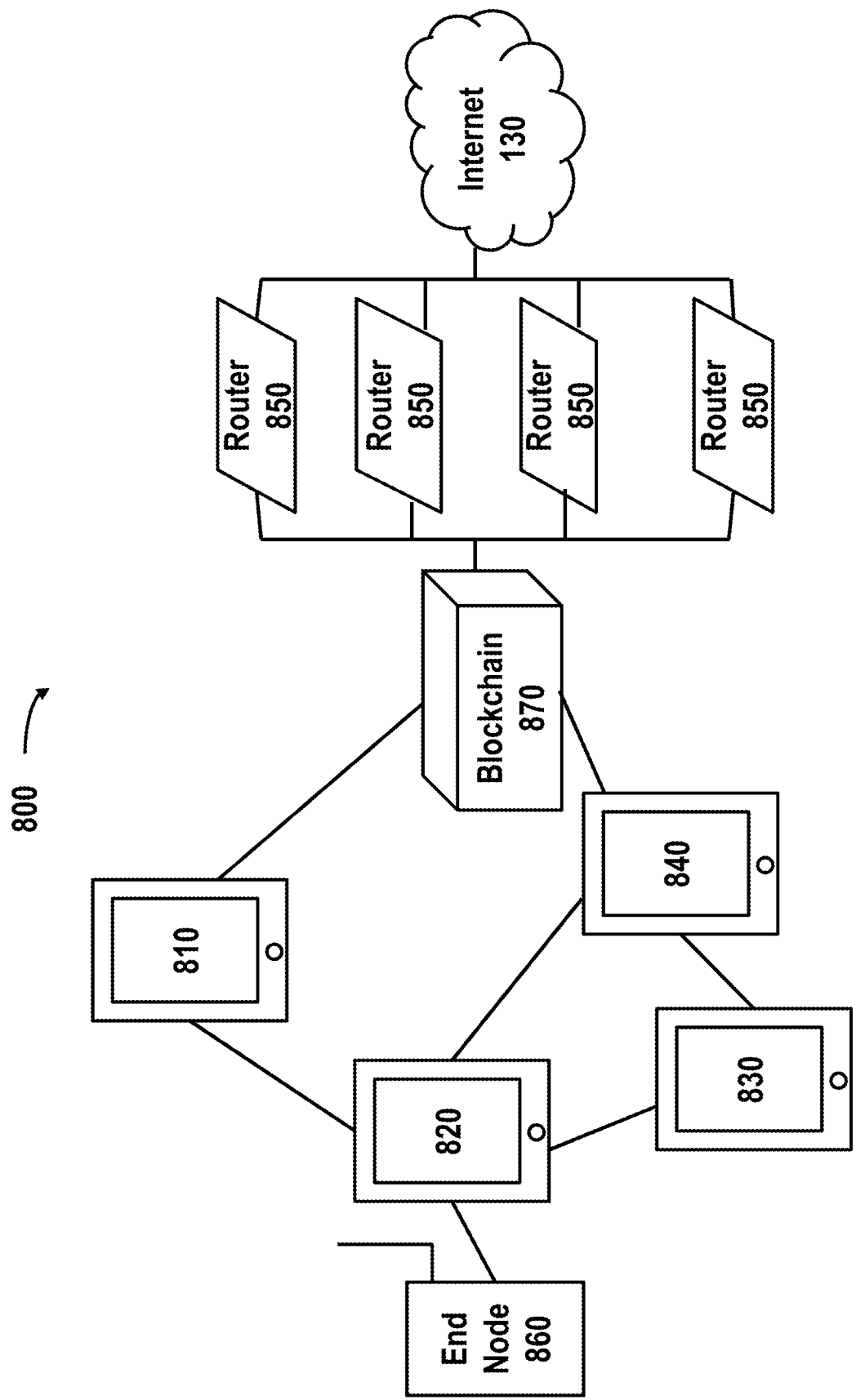
FIG. 8 shows an exemplary diagram of DLPWAN topology.

FIG. 8 shows an exemplary topology of the network 800, in accordance with embodiments of the invention. In some cases, provider-hosted gateways 810, 820, 830, 840 in the network may connect to a network interfacing device (e.g., router 820 application) on the TCP/IP Internet 130 and/or create wide-area RF coverage which end nodes 860 can use as a bridge to the Internet 130. The wide-area RF coverage and/or data transmission provided by the provider-hosted gateways 810, 820, 830, 840 may be managed by a decentralized blockchain consensus system as described above. In some embodiments, the provider-hosted gateways 810, 820, 830, 840 may be operated by the providers or nodes as described in FIG. 1 and the end node 860 may be operated by the participant as described in FIG. 1. In some cases, the provider-hosted gateways 810, 820, 830, 840 may be the same as the providers or nodes as described in FIG. 1.

The network 800 may be substantively stationary or dynamic. For example, the nodes or providers (i.e., the provider-hosted gateways 810, 820, 830, 840) may be movable. A geographical location of the nodes may change over time. The network may have any topology. The network topology may or may not be dynamic. In some cases, the network may have a star-of-stars topology such that multiple providers may be connected to a router application and each of the multiple providers may be capable of providing wide-area RF coverage to multiple end nodes as shown in FIG. 8. In some cases, the network may not be a mesh network. For instance, an end node may use a single hop to reach a gateway. For example, as illustrated in FIG. 8, the end node 860 of a participant 150 may use a single hop to reach a gateway 820. Then the gateway 820 can reach the Internet via other gateways 810, 820, 830, 840 and a router 850. The gateway may be selected based on multiple factors such as the geolocation of the gateway and price offered for coverage or data delivery. The selected gateway may be a gateway validated using the provided method and system as described above. Alternatively, the network may be a mesh network that a node may use multiple hops to reach a gateway. It is not intended that the invention be limited by the specific examples provided within the specification. For example, multiple end nodes may be connected to a single provider-hosted gateway, a single provider-hosted gateway may provide network coverage to multiple end nodes concurrently or sequentially, or multiple gateways may collectively provide coverage to the end nodes in a concerted manner.

The DLPWAN may implement an adjustable network scheme which allows routers 850 to coordinate with gateways 810, 820, 830, 840 and ultimately end nodes 860 to adjust modulations and/or data rates depending on a variety of network conditions and factors. For example, if a given end node 860 is in close proximity to a gateway 820, it may use a higher bandwidth and/or data rate to transmit and receive in order to optimize for transfer speed and battery life.

Traffic on the DLPWAN may be encrypted. For example, Galois/Counter Mode (GCM), such as AES-GCM, can be used for the encryption on the DLPWAN. End nodes 860 can require authentication to the network. For example, end nodes 860 can be authenticated the network via an elliptic Curve Diffie-Hellman key exchange (ECDH). In some cases, the security of the wireless network is stronger than a typical LPWAN implementation because all end nodes 860 in the network are required to have a hardware key-storage device. Additionally, the strong authentication scheme can allow for secure two-way communication which can be used to control equipment and devices.

Routers

Also disclosed herein are routers 850, which can be internet-deployed applications that can receive packets from end nodes 860 (e.g., via gateways 810, 820, 830, 840) and route them to appropriate Internet destinations 130, such as an HTTP or MQTT endpoint.

The routers can perform one or more of the following functions: 1) authenticating end nodes 860 with the DLP-WAN; 2) receiving packets from gateways 810, 820, 830, 840 and routing them to the Internet 130; 3) delivering downlink messages, such as OTA updates, to end nodes 860 via gateways 810, 820, 830, 840; 4) adjusting RF conditions on end nodes 860 such as data rate, transmit power, and modulation; and 5) providing authentication and/or routing mechanisms into third party cloud services.

When a gateway 810, 820, 830, 840 receives a data packet from an end node 860 on the network, it can perform a lookup to determine which router 850 to use, for instance, based on the network address of the end node 860. Routers 850 can be hosted by anyone on the network and/or can define end nodes traffic to be delivered there by any gateway 810, 820, 830, 840 on the network. This can allow participants 150 to create VPN-like functionality whereby encrypted data is delivered only to one or more routers 850 that they specify, and can optionally host themselves.

Network and RF information, such as Signal to Noise Ratio (SNR) and Received Signal Strength Indication (RSSI), can be periodically delivered from gateways 810, 820, 830, 840 to the appropriate routers 850. Routers 850 can make use of this data to advise end nodes 860 on RF settings, such as data rate and power amplification level, to be optimal given the physical location of an end node 860. This can allow for a high capacity network that can continuously improve and/or heal itself.

Routers 850 may implement a system for providing a secured connection. In some examples, the system may be a channel, which can handle the authentication and/or routing of data to a specific third party Internet application, such as Microsoft's Azure IoT Hub (azure.microsoft.com/en-us/services/iot-hub/). These channel implementations can take advantage of the onboard hardware security of an end node 860 to create a secure, hardware-authenticated connection to a third party, which can be difficult to implement directly on an embedded microcontroller. In some cases, a channel, which can be used to build additional interfaces to Internet services, can be implemented using open source software.

In some cases, the router 850 may be a cloud router, which can be for anyone to use. In some cases, the router 850 can be an open-source router that is available as source code and/or a binary package for a variety of operating systems and distributions, such as Microsoft Windows, mac OS, iOS, Chrome OS, BlackBerry Tablet OS, Unix, and Linux.

Physical Implementation

The DLPWAN may utilize any suitable wireless network communication technologies, such as, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™, or the like.

In some embodiments, the DLPWAN may be implemented on various hardware, such as commodity sub-1 GHz radio hardware. For example, the DLPWAN can be implemented on an ISM (industrial, scientific and medical) frequency band, such as the 900 MHz band, 33-centimeter band, 2.4 GHz ISM band, 5 GHz band, or 60 GHz band. The DLPWAN may communicate using unencumbered modulations, such as (G) FSK and PSK in a narrow band (6.25-250 kHz). The DLPWAN may be compatible and/or interoperable with multiple radios. The modulation format can be simple, widely supported, easy to modulate and demodulate, or may have resistance to RF noise. The DLPWAN may employ suitable mechanism to detect a transmission error. A transmission error may include random bit errors, long burst errors, packet loss, excessive delays that may be caused by possibly link downs or network congestion. Transmission error may be detected based on the specific transmission protocol, channel coding methods or various other factors. For example, transmission error may be detected by checking the redundancy bits compressed with the source bits (e.g., Forward Error Correction). An exemplary wireless protocol is described later herein. Forward Error Correction (FEC) can be implemented at the firmware level in order to maintain hardware compatibility among multiple vendors. The wireless networks may support any suitable communication technologies such as Bluetooth or Wi-Fi. The DLPWAN can be used in conjunction with one or more types of wireless or wired communication signals and/or systems.

Gateways

Gateways 810, 820, 830, 840 can be physical network devices. For example, gateways 810, 820, 830, 840 can create wireless RF coverage over wide areas, and/or act as mining nodes for the blockchain 870. The gateways 810, 820, 830, 840 can transmit data back and forth between routers 850 on the Internet 130 and end nodes 860 on the network, process blockchain contracts and micro-transactions, and/or provide validation and verification systems for the blockchain 870 mining process.

The wireless connection may be a direct wireless connection, such as Bluetooth (e.g., a wireless technology standard for exchanging data over short distances using short-wavelength UHF radio waves in the ISM band from 2.4 to 2.485 GHz), infrared, ZigBee™, near field communication, ultraband, WiFi (e.g., a technology for wireless local area networking with devices based on the IEEE 802.11 standards), or optical communications. The wireless connection may be a short-range wireless communications may be provided (e.g., on the order of reaching at least a few centimeters, tens of centimeters, meters, or tens of meters). The wireless connection may be an indirect wireless connection, such as 3G, 4G, LTE, GSM, or WiMax. The wireless connection may traverse a telecommunications network. The wireless communication may permit long-range wireless communications and/or may not be dependent on relative locations between the user device and the card reader. The wireless communication may traverse one or more intermediary devices or relay stations. The gateways 810, 820, 830, 840 may be configured to permit direct communications, indirect communications, or both. The gateways 810, 820, 830, 840 may be capable of switching between different communication types.

In some cases, the gateways 810, 820, 830, 840 can create long distance coverage, for example, at least about 50 meters, 75 meters, 100 meters, 125 meters, 150 meters, 175 meters, 200 meters, 225 meters, 250 meters, 275 meters, 300 meters, 350 meters, 400 meters, 450 meters, 500 meters, 550 meters, 600 meters, 650 meters, 700 meters, 750 meters, 800 meters, 850 meters, 900 meters, 950 meters, 1 kilometers, 2 kilometers, 3 kilometers, 4 kilometers, 5 kilometers, 6 kilometers, 7 kilometers, 8 kilometers, 9 kilometers, or 10 kilometers. Gateways 810, 820, 830, 840 can be a cost effective way to create wide area network coverage for compatible devices.

Gateways 810, 820, 830, 840 may connect to the Internet 130 using any TCP/IP capable backhaul, such as Ethernet, WiFi or cellular. The gateways 810, 820, 830, 840 may contain a radio frontend capable of listening to several MHz of RF wireless spectrum at a time, and/or can be able to hear all network traffic transmitted within that spectrum. In some cases, the gateways 810, 820, 830, 840 may use synchronized frequency hopping schemes.

The gateways 810, 820, 830, 840 may be located at or a component of any other device or system. The device or system may or may not be movable. In some cases, the gateway may be a component of a portable device or a movable object such that a geolocation of the gateway may be dynamic. The gateways 810, 820, 830, 840 can require a GPS or GNSS transceiver to obtain accurate position and/or date/time information. This satellite-derived location can be used in conjunction with a variety of other techniques to verify that a gateway is in fact providing wireless network coverage in the location it claims, and/or to mine tokens for that service.

Satellite location information can also be correlated with packet arrival events to provide Time Differential of Arrival (TDoA) location for end nodes 860 if multiple gateways 810, 820, 830, 840 observe the same packet. This can allow end nodes 860 to physically locate themselves without requiring a GPS/GNSS transceiver. It can also provide accurate location data at a fraction of the battery life and cost of competing methods.

End Nodes

An end node 860 can be any wireless device capable of communicating with gateways 810, 820, 830, 840 on the network. The end nodes may or may not be low power devices. In some cases, end nodes 860 may be low power devices with low data rate, such as sensors, actuators, Bluetooth devices, infrared devices, WiFi devices, optical devices, meters, on-street lighting control, precision agriculture controller and the like. Alternatively, the end node 860 can be any device that may not be low power device that is able to establish a connection to a gateway to further connect to a wide area network. In some cases, end nodes 860 can be battery-powered sensors. In some cases, end nodes 860 can be devices that can live for several years using standard batteries. In some cases, end nodes 860 can also be mains-powered.

End Nodes 860 can exist in a variety of forms, depending on the product or use case, and a variety of transmission and reception strategies can be employed to optimize for transmission/reception frequency or battery life.

The DLPWAN can be designed such that end nodes 860 can be manufactured using commodity hardware available from a wide variety of vendors, and/or for a low cost Bill Of Materials (BOM). The technology in modern radio transceiver integrated circuits (ICs), such as the Texas Instruments CC1125 or STMicroelectronics S2-LP, combined with modern Forward Error Correction (FEC) techniques can enable long-range network systems that can be built without the need for proprietary modulation schemes or physical layers.

In some cases, the end node 860 may use the Microchip ECC508A (www.microchip.com/wwwproducts/en/ATECC508A) or equivalent hardware-based key storage device, which can be able to securely generate, store, and authenticate public/private NIST P-256 ECC key pairs without leaking the private key to anyone. In addition, a wide array of defense mechanisms can prevent logical attacks on the encrypted data between the key storage device and its host end node 860, along with physical protections on the security device itself. The participant 150 can program their key storage device as part of the onboarding process defined in the wireless specification.

Geolocation

In some embodiments of the invention, a provider may provide information to end nodes in addition to data transmission. For example, an end node may not be capable of geolocating itself and a provider may provide geolocation to an end node. In some instances, gateways may include hardware and software to enable the location of the gateway (e.g., via GPS/GNSS) and/or to triangulate the location of an end node 860, for example (e.g., via Time Differential of Arrival (TDoA)).

Gateways in the DLPWAN may accomplish TDoA location using a radio frontend configured to output raw I/Q sample data, which can then be post-processed and compared to GPS location and time to calculate the radio packet's time of flight. With enough of these time-of-flight calculations, from several gateways, the position of the end node can be calculated to within several meters.

A typical GPS module can be expensive, consumes more power, and have limited use at indoor location (e.g., require a view of the sky). Providing geolocation as a network service can make the end nodes 860 cheaper, more power efficient, and/or to be located accurately indoors. Further, because these data transmission events occur in the context of a blockchain, an unforgeable cryptographic proof of location for an end node 860 can be obtained. Devices with the ability to prove that they were in a specific place at a specific time can be used in IoT applications.

Figure 9:
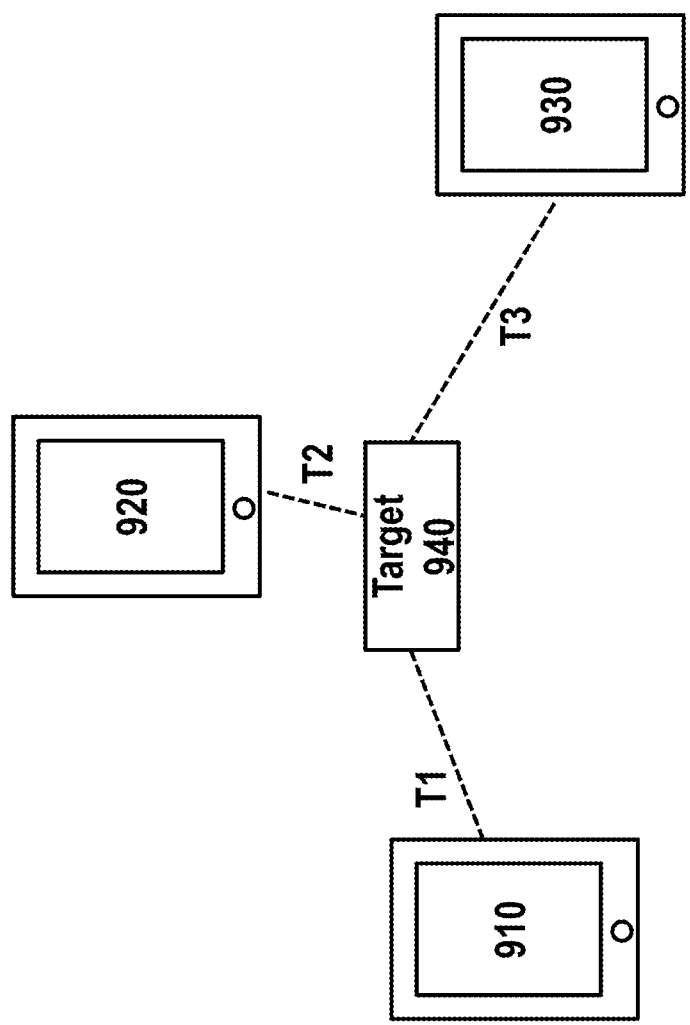
FIG. 9 shows an exemplary diagram of geolocation via TDoA.

In an example shown in FIG. 9, when multiple gateways 910, 920, 930 see the same packet from a target end node 940, and each gateway 910, 920, 930 has a known location and/or date/time through a GPS lock, the differences in reception time (T1, T2, and T3), signal quality, and GPS location can be analyzed to provide an accurate estimate of the position of the target end node 940. In some cases, no special hardware or network transmissions is required on the end node 940.

In some cases, geolocation can use at least 2 gateways, for example, at least 3, at least 4, at least 5, at least 6, at least 7, at least 8, at least 9, at least 10, at least 20, at least 30, at least 40, or at least 50 gateways, which can hear the same packet at the same time. Because each gateway on the network can listen on a wide range of radio spectrum, every gateway in range can hear the same packet with a nanosecond-level variance in the timing. In some cases, gateways 910, 920, 930 can synchronize their clocks via GPS such that all gateways 910, 920, 930 can be sure to have the same nanosecond-synchronized clock source with which to timestamp packets.

Server-Side Location Solving

Once the end node's specified router 850 has received a location-enabled message (e.g., specifically multiple copies of the same message with varying timestamps, GPS locations, and RF info like SNR and RSSI), the router 850 may solve for the location of the device, for instance, using a TDoA-based location algorithm, such as long range navigation (LORAN).

In some cases, a router may choose a location algorithm to solve for location based on packets it receives. This can be implemented as a channel to a third-party location solver Application programming interface (API), or as an internal function within the Router itself.

Wireless Specification

The wireless protocol disclosed herein can efficiently transmit data over wide areas and/or minimize power usage. In some cases, end nodes using the wireless protocol can last years in the field powered only by batteries. For example, the end nodes can last at least 1, at least 2, at least 3, at least 4, at least 5, at least 6, at least 7, at least 8, at least 9, or at least 10 years in the field powered only by batteries.

In some cases, the end nodes may use Frequency Shift Keying (FSK) and/or Gaussian Frequency Shift Keying (GFSK) in the industrial, scientific, and medical radio band (ISM bands) to communicate with gateways. For example, the ISM band can be an unlicensed band. In some cases, Forward Error Correction (FEC) schemes can be used by the wireless specification. In some cases, the radio transceivers used herein can be STMicroelectronics S2-LP, Texas Instruments CC1125, or NXP OL2385AHN.

The wireless communication between end nodes and gateways can take place in an unlicensed spectrum (e.g., ISM band). In some cases, the wireless communication can take place in the sub-GHz portion of the unlicensed spectrum.

The data rate of the network may range from 0.1 kilobit per second (kbps) to 500 kbps, for example, from 0.1 kbps to 1.0 kbps, from 0.1 kbps to 10 kbps, from 0.1 kbps to 100 kbps, from 0.1 kbps to 250 kbps, from 0.1 kbps to 500 kbps, from 0.3 kbps to 1.0 kbps, from 0.3 kbps to 10 kbps, from 0.3 kbps to 100 kbps, from 0.1 kbps to 250 kbps, from 0.3 kbps to 500 kbps, from 1.0 kbps to 10 kbps, from 1.0 kbps to 100 kbps, from 1.0 kbps to 250 kbps, from 1.0 kbps to 500 kbps, from 10 kbps to 100 kbps, from 10 kbps to 250 kbps, from 10 kbps to 500 kbps, from 100 kbps to 250 kbps, from 100 kbps to 500 kbps, or from 250 kbps to 500 kbps. In one example, the data rate of the network can range from 0.3 kbps to 250 kbps.

The bandwidth of the network may range from 0.1 kilohertz (kHz) to 500 kHz, for example, for example, from 0.1 kHz to 1.0 kHz, from 0.1 kHz to 10 kHz, from 0.1 kHz to 100 kHz, from 0.1 kHz to 250 kHz, from 0.1 kHz to 500 kHz, from 0.3 kHz to 1.0 kHz, from 0.3 kHz to 10 kHz, from 0.3 kHz to 100 kHz, from 0.1 kHz to 250 kHz, from 0.3 kHz to 500 kHz, from 1.0 kHz to 10 kHz, from 1.0 kHz to 100 kHz, from 1.0 kHz to 250 kHz, from 1.0 kHz to 500 kHz, from 10 kHz to 100 kHz, from 10 kHz to 250 kHz, from 10 kHz to 500 kHz, from 100 kHz to 250 kHz, from 100 kHz to 500 kHz, or from 250 kHz to 500 kHz. In one example, the data rate of the network can range from 6.25 kHz to 250 kHz. The network can use at least 1 channel, for example, at least 10, at least 50, at least 100, at least 200, at least 300, at least 400, or at least 500 channels. The network can use Frequency Hopping Spread Spectrum (FHSS).

The network (e.g., end nodes and gateway commutations) may use a blend of data rates and/or frequency channels. The data rates and/or frequency channels can be chosen dynamically. In some cases, the devices can trade off communication range for message duration (and vice versa) when transmitting data.

In some cases, end nodes may transmit on any channel, at any time, using any available data rate, for example, provided that they select channels in a random fashion for each new transmission and adhere to all region-specific duty cycle and transmit duration regulations.

In some cases, communication between end nodes and cloud-based applications can be bi-directional. For example, the cloud-based applications can receive data and issue downlink commands. The network can tune device-level data rates and/or modulation characteristics. The network can transmit output.

The system disclosed herein can provide a cost effective way for end nodes to transmit and receive data, geolocate themselves in physical space, and/or provide a mechanism for sensor data to be bought and sold. The cost for these services can be cheaper than any existing alternative available today due to the inexpensive and distributed nature of creating network coverage.

A currency (e.g., token) can be distributed and used along with blockchain to facilitate the transactions. A participant end node can pay a provider gateway, via the currency, to transmit data, receive data, and/or geolocate itself. The provider and the participant can negotiate the price of this exchange via an automated bidding process.

Participants can have the ability to accept payments for sensor data being transmitted from their devices. In some cases, an entity may be willing to pay for the sensor data, such as environmental or traffic data.

Figure 10:
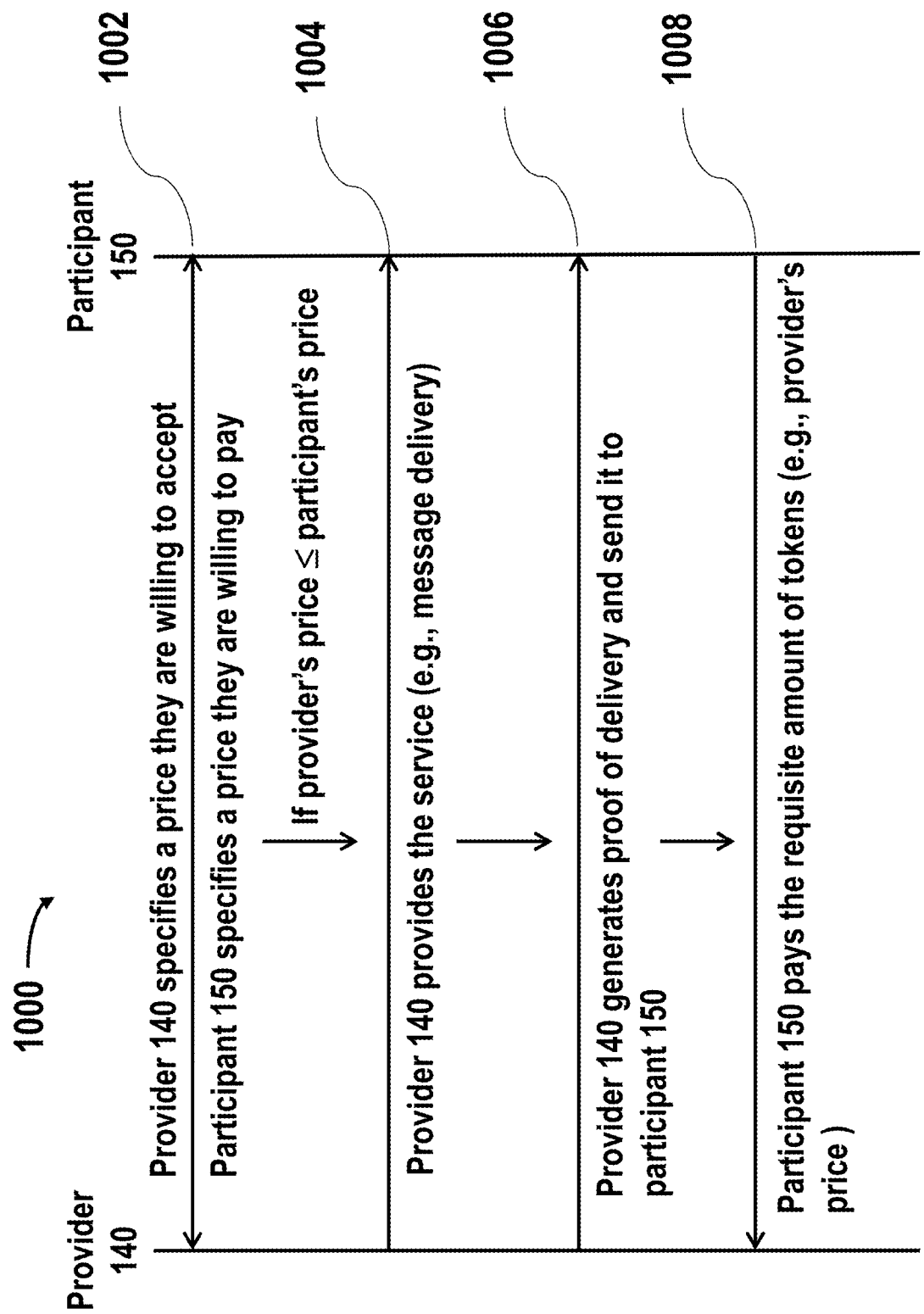
FIG. 10 shows an exemplary flowchart of a transaction between a provider and a participant.

FIG. 10 shows an exemplary process of a transaction between participants 150 and providers 140 that sets bid and ask values for data transfer between end nodes and gateways 1000. This process can provide a demand-driven economy for coverage and/or data transfer. In some cases, the process has no arbitrary pricing. In some cases, the process has no single-vendor controlling the pricing. This process can allow providers 140, who have access to privileged locations (e.g., highways or airports), or who use expensive backhaul (e.g., cellular or satellite), to earn more for their service.

The cost for per-message transmission can continue to fall over time as the volume of end nodes on the network increases. Providers 140 can also reduce their per-message costs due to the overall increased volume of traffic.

Providers

Providers 140 may specify the price they are willing to accept for coverage, message delivery, and/or geolocation services 1002. In some cases, geolocation can be priced more expensively, as it may require more copies of the packet and/or a correlation among multiple gateways to be performed.

The payout for delivering a message can be paid to the first provider to confirm the delivery to the correct router at the lowest price within a certain amount of time. If a gateway declines to deliver a packet because the price is too low, it can notify the router of this so the provider can adjust their bid appropriately.

In some cases, the payouts for geolocation can be split among all the providers that provide a useful copy of the packet within a specified time window.

Participants 150 and providers 140 can incentivize creating additional RF coverage. In some cases, a provider 140 in the incentivized area who successfully mines tokens can gain an additional coinbase reward for each block mined. The additional coinbase reward can be proportional to the amount of tokens staked by the incentivizing entity. This process can be used as a mechanism to incentivize the creation of new coverage. Once network coverage has sufficiently expanded, the ongoing message delivery fees and mining new tokens can sustain the provider.

Participants

Participants 150 can specify what they are willing to pay to network coverage, message delivery, and geolocation of their end nodes 1002. As described in the example above, if a provider 140 within range is willing to meet or beat the price of the bid, then the provider 140 may provide the service (e.g., message delivery) 1004, the provider 140 may successfully proves delivery of the service (e.g., message) 1006, and the requisite amount of tokens may be transferred from the participant 150 to the provider 140, 1008.

If a gateway declines to deliver a packet because the bid from the participant is too low, it can notify the router of this so the participant can adjust their bid appropriately.

Proof of Delivery

In some embodiments of the invention, the system or network may employ a process to proof a work is delivered. Proof of delivery can comprise a return receipt signed by the destination, such as a router or an end node, depending on the direction the data was sent. For example, end nodes can request a return receipt when sending a packet, and the destination can generate a receipt based on the message received, signs it and returns it. The proof of delivery can allow devices to check if they in fact have working end-to-end transport.

State Channels

In some embodiments, the provided system may employ state channels. In some cases, some of the transactions may be off-blockchain transactions. State channels may be off-chain and private, known only to its participants, which means they allow for instant and anonymous transactions within them. State channels may have a limited lifespan which is predetermined based on time or amount of transactions carried out. Participants may also close their channel by providing the last updated state of transactions to the blockchain. In an example, state-altering operations, which are normally performed on a blockchain, may be conducted off of the blockchain in state channels, such as the payment channels in Bitcoin. For example, payment channels in Bitcoin can have instant fee-less payments to be sent directly between two parties. Moving these interactions off of the blockchain without requiring any additional trust can lead to significant improvements in cost and speed.

The network may support traditional on-chain transactions and/or transactions on state channels. The state channels can be a multi-party payment network that is similar to the Bitcoin Lightning Network (Joseph Poon, Thaddeus Dryja, The Bitcoin Lightning Network, lightning.network). In some cases, IoT payment schemes can require many small payments that are not practical in traditional on-chain transactions.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

The instructions, media for conveying such instructions, computing resources for executing them, and other structures for supporting such computing resources are means for providing the functions described in these disclosures.

Methods and systems according to the above-described examples can be implemented using hardware, software or a combination of both. For instance, the system may comprise one or more processors and at least one memory for storing program instructions. The processors can be part of a network interface system or a node device. Alternatively or additionally, the processors can be part of the host system of a node device. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the system can be implemented in hardware components (e.g., ASICs, special purpose computers, or general purpose computers), software or combinations of hardware and software.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for facilitating data transmission comprising:
   (i) a decentralized blockchain consensus network comprising a plurality of nodes, wherein one or more nodes from the plurality of nodes provide a wireless network coverage to other devices and wherein a blockchain of the decentralized blockchain consensus network is used to manage and verify the wireless network coverage;
   (ii) a mining node from the plurality of nodes configured to:
      (a) determine a target node, from the one or more nodes that provide the network coverage, to be validated by the mining node;
      (b) mine a block by performing a validation comprising: validating a geographic location of the target node, and proofing a time of the target node is correct, wherein the block is related to the network coverage provided by the target node; and
      (c) receive, by the mining node, a token for rewarding the mining node of performing the validation, wherein a value of the token is dynamically determined based at least in part on a geographic location of the plurality of nodes.

2. The system of claim 1, wherein the target node is a gateway device that is capable of providing data transmission service.

3. The system of claim 2, wherein the target node bridges one or more low power wireless devices to a wide area network.

4. The system of claim 2, wherein the data transmission service is wireless data transmission.

5. The system of claim 1, wherein the target node is determined based on a history of validation associated with the target node.

6. The system of claim 1, wherein the target node is determined based on a score that is a function of a previous validation of the target node.

7. The system of claim 1, wherein validating the time of the target node comprises using a time synchronization protocol.

8. The system of claim 1, wherein validating the geographic location of the target node comprises requesting one or more peer nodes located within pre-determined proximity of the target node to validate the geographic location of the target node.

9. The system of claim 1, further comprising one or more verifier nodes from the plurality of nodes for verifying the validation performed by the mining node.

10. The system of claim 1, wherein the value of the token is further determined based on a result of the validation.

11. The system of claim 1, wherein the mining node is configured to further record a result of the validation in the block of the blockchain.

12. The system of claim 8, further comprising one or more verifiers from the plurality of nodes, wherein the one or more verifiers are configured to verify the validation performed by the mining node using public keys for the mining node, the target node and/or the one or more peer nodes.

* * * * *